(12) United States Patent
Hruza

(10) Patent No.: US 6,277,279 B1
(45) Date of Patent: Aug. 21, 2001

(54) METHOD FOR TREATING WASTEWATER

(75) Inventor: Sandra Hruza, Houston, TX (US)

(73) Assignee: BioNutraTech, Inc., Houston, TX (US)

( * ) Notice: Subject to any disclaimer, the term of this patent is extended or adjusted under 35 U.S.C. 154(b) by 0 days.

(21) Appl. No.: 09/399,903

(22) Filed: Sep. 21, 1999

(51) Int. Cl.$^7$ .................................................. C02F 3/00
(52) U.S. Cl. ................................................. 210/610
(58) Field of Search ............................................ 210/610

(56) References Cited

U.S. PATENT DOCUMENTS

| | | |
|---|---|---|
| 5,242,592 * | 9/1993 | Ballnus . |
| 5,443,845 | 8/1995 | Felix . |
| 5,725,885 | 3/1998 | Felix . |
| 5,954,868 | 9/1999 | Felix . |

OTHER PUBLICATIONS

Sigma–Aldrich Chemical Co., product sheets from catalog for stearic acid, palmitic acid, lauric acid, oleic acid, linoleic acid, at http://www.sigma–aldrich.com, including Material Safety Data Sheet for stearic acid, printed by patent examiner on Feb. 25, 2001.* www.bionutratech.com, "BINUTRIX™" page, printed Feb. 25, 2001.*

* cited by examiner

*Primary Examiner*—Chester T. Barry
(74) *Attorney, Agent, or Firm*—Streets & Steele; Jeffrey L. Streets

(57) ABSTRACT

The present invention provides a method for promoting growth of microbes capable of degrading organic material in various wastewater streams. The method includes applying a composition that comprises fatty acids, preferably a combination of one or more saturated fatty acids and one or more unsaturated fatty acids which are shown to provide synergistically greater microbial degradation than any of the saturated or unsaturated fatty acids alone. Because the unsaturated fatty acids tend to be in the liquid phase at room temperature, it is preferred to provide the combination of saturated and unsaturated fatty acids together to form a solid particulate at room temperature and remain a solid even at elevated outdoor temperatures.

26 Claims, No Drawings

METHOD FOR TREATING WASTEWATER

FIELD OF THE INVENTION

This invention relates to a method of treating wastewater.

BACKGROUND OF THE INVENTION

Wastewater treatment is an ongoing concern for every municipality as well as many industrial facilities. The wastewater emitted from these sources must be treated, tested and returned to the water system in compliance with EPA standards. With increasing population as well as industrial demands on the waste water system, greater attention is being directed at the costs and safety of producing clean water.

Excess ammonia levels in water present health problems for humans as well as animals. Ammonia increases the oxygen demand in the water, leading to a toxic environment for marine life and can reduce the oxygen-carrying capacity of the blood in humans. It is therefore very important to remove ammonia from wastewater.

In addition, commercial food services and individual residences produce wastewater solid wastes that must be treated and disposed of in an appropriate manner. A safe way to degrade these types of organic waste quickly and efficiently would be highly desirable.

Water can become contaminated by chemicals through runoff from fields or industrial facilities, as well as accidental releases to the ground or water. Particularly troublesome toxic contaminants include PCB's, TCB's, pesticides, herbicides and the like. A safe, effective way to promote the degradation of these compound in situ would save money, time, and reduce the risk of further contamination.

The success or effectiveness of bioremediation is dependent upon key factors being simultaneously present. First, the presence of microorganisms capable of degrading organics either naturally or by addition. Second, there must be oxygen and water available to permit the microorganisms to be metabolically active. Third, biologically utilizable nitrogen and phosphorous are generally throught to be required to further encourage the microbial population to rapidly metabolize the available organics.

Microorganisms capable of degrading organic (carbon-containing) substances or compounds can be found in almost all natural bodies of water. The exact type of microorganisms present in a given water stream or region may vary greatly yet each has the ability to organic materials. The elemental nutrient requirements of microbes are approximately the same as the microbes' average elemental composition. The carbon, which makes up 48 percent of the microbes' composition, is obtained from the organic compounds, such as sewage or hydrocarbons. However, the remaining elemental materials necessary to grow must be provided from either the organic compounds to be degrades, the surrounding water, or a supplementary source. Potentially, any imbalance in the presence or supply of nutritional requirements or conditions hostile to growth of the microbes can limit or change the microbial growth and, consequently, the degradation of organic compounds in the wastewater.

Therefore, there is a need for a method and composition that promotes the growth of indigenous microbes found in organic wastewater sources. It would be desirable for the method and composition to sustain growth of certain microorganisms that are capable of efficient and thorough degradation of the organic waste to be degraded. It would also be desirable for the method and composition to assist in the microbial metabolism of organic wastes in a way that not only meets the basic biological demands of the microorganisms, but essentially accelerates the growth of the microbial population.

SUMMARY OF THE INVENTION

The present invention provides a method for degrading organic material in wastewater, for example water containing aromatic hydrocarbons, sewage, petroleum hydrocarbons, grease, fats and oils. The method comprises adding one or more fatty acids into the wastewater. While the fatty acids may be any individual or combinations of fatty acids, the fatty acids preferably comprise one or more saturated fatty acids and one or more unsaturated fatty acids. Most preferably, the one or more fatty acids comprises a saturated fatty acid selected from stearic acid, palmitic acid, lauric acid or mixtures thereof and an unsaturated fatty acid selected from oleic acid, linoleic acid or mixtures thereof. The fatty acid compositions are preferably solidified to form pellets, powder, granules, or cakes.

One embodiment of the invention utilizes a fatty acid composition consisting essentially of one or more fatty acid, preferably a saturated fatty acid and an unsaturated fatty acid. More particularly, the fatty acid composition may be used without or in the absence of supplemental sources of nitrogen, phosphorus or potassium.

DETAILED DESCRIPTION OF THE INVENTION

The present invention provides a method for promoting growth of microbes capable of degrading organic material in water. The method includes applying a composition that comprises fatty acids, preferably a combination of one or more saturated fatty acids and one or more unsaturated fatty acids. Because the unsaturated fatty acids tend to be in the liquid phase at room temperature, it is preferred to provide the combination of saturated and unsaturated fatty acids together to form a solid particulate at room temperature and remain a solid even at elevated outdoor temperatures. Optionally, an oxygen releasing compound or non-indigenous microbes may be included in the composition.

In accordance with the invention, it has been found that the addition of nutrients to organic wastes may not be necessary to promote microbial growth, especially in certain applications having already significant nutrient content. However, it has never before been recognized that fatty acids could be used to increase indigenous microbe growth and subsequent biodegradation of a wide range of organic waste products. The synergistic effect of combining a saturated and unsaturated fatty acid is particularly a surprising and unexpected result.

The method and composition of the present invention are useful in enhancing the growth of microbes present in various types of bioremediable organic wastes such as ammonia, particles, carbohydrates, sugars, fats, oils, grease, urea, starches, municipal waste water, industrial waste water, animal or domestic sewage, and certain medical wastes containing body fluids. The composition is also useful for promoting the growth of microbes that degrade aromatic hydrocarbons such as PCB's, TCE, pesticides, herbicides and any other chemical deemed to be bioremediable.

The formulation of this invention uses a mixture of saturated and unsaturated fatty acids to form a composite which is readily biodegradable and has physical properties making it efficient for promoting microbial growth. More particularly, the fatty acids form an oleophilic and biodegradable composition comprising oleic acid and a carboxylic acid selected from the group consisting of stearic acid, palmitic acid, and mixtures thereof. The formulation of the present invention may be prepared with any ratio of saturated fatty acids and unsaturated fatty acids where the resulting material is sufficiently biodegradable to release fatty acids as needed and has a sufficiently high melting temperature to allow the material to be stored without clumping together. The preferred ratio of oleic acid (or any of the unsaturated fatty acids) to the saturated fatty acids is between about 70:30 and about 30:70 by weight, most preferably between 60:40 and 40:60 by weight.

While a combination of fatty acids may simply be mixed together to form a solid, a liquid or a slurry, the composition can be made in accordance with the methods set out in U.S. Pat. Nos. 5,725,885 and 5,443,845, which are hereby incorporated by reference, to form a solid particle or powder. To prepare the composition, the fatty acids are mixed together, heated to melting at 100° C., then cooled to produce a homogenous solid composite mixture.

The composite material is preferably manufactured either as a powder, pellet or particulate of varying size. The pellet or cake form is particularly useful in grease traps because the size and bulk of the material ensures that the composition will remain resident in the grease and area not washed away. The microbes will, over time, consume the composition as well as the surrounding organic wastes. Supplemental applications of the formulaiton can be made to ensure sufficient fatty acid concentrations are available to foster and sustain enhanced microbial growth.

The exact interval and the weight of product per unit area is based upon factors such as the degree of organic contamination, composition of the organic waste, type of bacteria present and microbial activity. Application of this product to organic waste does not significantly alter the physical consistency of the environment, and will not adversely impact conventional clean-up activities, nor will conventional wastewater treatment activities adversely harm the activity of the fatty acids.

One primary advantage of using the present fatty acid composition for treating sewage and other waste that has a naturally high concentration of nitrogen, typically in the form of ammonia, is that the addition of the fatty acids will promote the microbial growth and remediation of the organic waste, even without the additional of nutrients.

In one embodiment, the fatty acid composition may be mixed with compounds that provide a source of molecular oxygen including, but not limited to, calcium peroxide and urea hydrogen peroxide. These compounds release molecular oxygen ($O_2$) by enzymatic or chemical reactions. This molecular oxygen is utilized by the microorganisms to enhance and promote aerobic metabolism throughout the waste environment rather than solely at the interface. These oxygen releasing compounds may be incorporated into the fatty acid compositions described herein. It is preferred that the oxygen releasing compounds comprise between about 1 and about 20 percent (%) by weight of the fatty acids.

Because hydrogen peroxide is known to be unstable in aqueous solutions and is also toxic to microorganisms at high concentrations, the oxygen releasing compounds of hydrogen peroxide are incorporated as encapsulated particulates. Utilization of hydrogen peroxide and peroxide compounds to enhance microbial growth has been well documented, but has seen little practical application in the field because of the previously noted problems—stability and toxicity. The encapsulation of particulate peroxide compounds (as example being, but not limited to, urea hydrogen peroxide) stabilize the materials by keeping the compounds from rapidly reacting with water or divalent cations which promote peroxide degradation (for example $Fe^{+2}$). The encapsulation also prevents the toxicity of rapid peroxide decomposition from effecting the microorganisms through regulated release of compounds at concentrations that support microbial growth and limit promotion of toxic oxygen radicals.

While the fatty acids may be used in any concentration, they are preferably applied at a rate of between 0.01 and 1 pounds per thousand gallons, more preferably between 0.02 and 0.2 pounds per thousand gallons processed. The fatty acid compositions and methods of the invention are suitable for use with various wastewater streams. For purposes of this application, the term "wastewater" is intended in its broadest send to include water containing organic materials, specifically including municipal and industrial waste streams, pig and cattle slurries, other animal and human waste streams, slaughterhouse wastes, and the like.

The effectiveness of the fatty acids in promoting microbial degradation is shown in the following examples.

EXAMPLE 1

A test was performed to determine the relative performance of various additive on the bioremediation or degradation of wastes suspended in water. Measurements of the "biological oxygen demand" (BOD) and "total suspended solids" (TSS) were taken as representative of the progress of the microbial growth and effectiveness of the degradation brought about by the microbes.

Approximately five pounds of pig waste was collected from a feedlot and diluted in five gallons of deionized water. The mixture was allowed to sit for 24 hours to insure that the waste formed a uniform mixture. Five hundred milliliters (500 ml) of the aqueous waste mixture was added to each of 13 two-liter glass bottles that were closed with Teflon lined caps. Ammonium hydroxide was added to each container for a final concentration of 2000ppm.

The samples were diluted with water 2:1 and filtered to remove large particulate matter. Various fatty acids and combinations of fatty acids were added to each bottle and the bottles were placed in a tumbler at 25 degrees C. Seven of the bottles were used in a seven-day test and six of the bottles were used in a twelve-day test.

Results

Standard EPA test methods were used for all test measurements.

TABLE 1

| | | Seven-day test | | | |
|---|---|---|---|---|---|
| FATTY ACID | AMOUNT (grams) | BOD (ppm) | TSS (ppm) | PLATE COUNT (per 100 ml) | APPEARANCE |
| Strearic | 0.1 | — | 16,080 | — | Darkened |
| Lauric | 0.1 | — | 16,040 | — | — |
| Linoleic | 0.1 | — | 15,780 | — | Darkened |
| Oleic | 0.1 | — | 15,600 | — | Darkened |
| Corn Oil | 0.1 | — | 15,890 | — | — |
| Coated Nutrient | 0.5 | — | 15,660 | — | Darkened |
| Blank | 0.0 | — | 16,070 | — | — |

TABLE 2

Twelve-day test

| FATTY ACID | AMT. (gm) | BOD (ppm) | −ΔBOD (%) | TSS (ppm) | −ΔTSS (%) | PLATE COUNT (per 100 ml) | APPEARANCE |
|---|---|---|---|---|---|---|---|
| Strearic | 0.1 | 6660 | 9.5 | 455 | 10.0 | 2.0 E4 | Grey/brown with black precipitation |
| Oleic | 0.1 | 6050 | 13.0 | 407 | 19.6 | 4.3 E4 | Grey/black with black precipitation |
| Linoleic | 0.1 | 6102 | 12.2 | 439 | 13.3 | 6.0 E4 | Grey/black with black precipitation |
| Linoleic/ Stearic | 0.1 | 4800 | 31.0 | 328 | 35.0 | 4.2 E5 | Grey with trace of precipitation |
| Oleic/ Stearic | 0.1 | 4960 | 28.6 | 379 | 29.5 | 1.1 E5 | Grey with trace of precipitation |
| Blank | 0.0 | 6950 | 0.0 | 506 | 0.0 | 7.1 E3 | Grey/brown with black precipitation |

BOD (biological oxygen demand) and TSS (total suspended solids) was measured 10 on each sample. The sample treated with stearic acid alone showed a 9.5% BOD reduction and a 10.0% TSS reduction. The sample treated with oleic acid showed a 13.0% BOD reduction and a TSS reduction of 19.6%. The sample treated with linoleic acid alone showed a 12.2% reduction in BOD and a 13.3% reduction in TSS.

The samples treated with a linoleic/stearic (unsaturated/saturated) combination of fatty acids showed a BOD reduction of 31.0% and a TSS reduction of 35.0%. The samples treated with a oleic/stearic (again unsaturated/saturated) combination of fatty acids showed a BOD reduction of 28.6% and a TSS reduction of 29.5%.

It is interesting to note that while each of stearic acid, oleic acid and linoleic acid yeilded BOD levels of 6660, 6050 and 6102 ppms and TSS levels of 455, 407 and 439, respectively, the combinations of linoleic/stearic and oleic/stearic yeilded BOD levels of 4800 and 4960 (an average BOD reduction of 22% greater than with the component fatty acids) and TSS level of 328 and 379 (an average TSS reduction of 18.7% greater than with the component fatty acids), respectively. This indicates that the two combinations of a saturated and unsaturated fatty acids have a statistically significant positive effect on the reduction of organic waste with high ammonia concentrations. Furthermore, these results suggest that there is a synergistic effect provided when a saturated and unsaturated fatty acid are used in combination.

It will be understood that certain combinations and subcombinations of the invention are of utility and may be employed without reference to other features in subcombinations. This is contemplated by and is within the scope of the present invention. As many possible embodiments may be made of this invention without departing from the spirit and scope thereof, it is to be understood that all matters hereinabove set forth are to be interpreted as illustrative and not in a limiting sense.

While the foregoing is directed to the preferred embodiment, the scope thereof is determined by the claims which follow:

What is claimed is:

1. A method for degrading organic material in wastewater, comprising:
   adding a fatty acid composition into the wastewater, wherein the fatty acid composition consists of one or more fatty acids selected from saturated fatty acids, unsaturated fatty acids, and combinations thereof.

2. The method of claim 1, wherein the one or more fatty acids is selected from the combinations of saturated and unsaturated fatty acids.

3. The method of claim 1, wherein the the combinations of saturated and unsaturated fatty acids consists of a saturated fatty acid selected from stearic acid, palmitic acid, lauric acid or mixtures thereof and an unsaturated fatty acid selected from oleic acid, linoleic acid or mixtures thereof.

4. The method of claim 2, wherein the combinations of saturated and unsaturated fatty acids are provided in a ratio of the one or more saturated fatty acids to the one or more unsaturated fatty acids between 70:30 and 30:70 by weight.

5. The method of claim 1, wherein the one or more fatty acids consists essentially of oleic acid and stearic acid.

6. The method of claim 4, wherein the ratio of the one or more saturated fatty acids to the one or more unsaturated fatty acid is between about 60:40 and 40:60 by weight.

7. The method of claim 1, wherein the one or more fatty acids consists essentially of linoleic acid and stearic acid.

8. The method of claim 1, wherein the one or more fatty acids is applied in a sufficient amount to enhance microbial degradation.

9. The method of claim 1, wherein the one or more fatty acids are solidified.

10. The method of claim 1, wherein the organic material is selected from aromatic hydrocarbons, sewage, petroleum hydrocarbons, grease, fats, oils, and combinations thereof.

11. The method of claim 9, wherein the one or more solidified fatty acids comprises one or more saturated fatty acids and one or more unsaturated fatty acids.

12. The method of claim 11, wherein the one or more solidified fatty acids are formed into pellets, powder, granules, or cakes.

13. The method of claim 1, wherein the organic material comprises an aromatic hydrocarbon.

14. A method for degrading organic material in wastewater, comprising:
   adding a fatty acid composition into the wastewater, wherein the fatty acid composition consists essentially of one or more fatty acids selected from saturated fatty acids, unsaturated fatty acids, and combinations thereof, and wherein the organic material is selected from aromatic hydrocarbons, TCE, pesticides, herbicides, and combinations thereof.

15. The method of claim 1, wherein the fatty acid composition is added to the wastewater at a rate of between 0.01 and 1 pounds per thousand gallons of wastewater.

16. The method of claim 2, wherein the ratio of the one or more saturated fatty acids to the one or more unsaturated fatty acid is between about 60:40 and 40:60 by weight.

17. The method of claim 1, wherein the one or more fatty acids consists essentially of linoleic acid and stearic acid.

18. The method of claim 1, wherein the one or more fatty acids are solidified.

19. A method for degrading organic material in wastewater, comprising:
adding a fatty acid composition into the wastewater, wherein the fatty acid composition consists essentially of a source of molecular oxygen and one or more fatty acids selected from saturated fatty acids, unsaturated fatty acids, and combinations thereof.

20. The method of claim 19, wherein the step of adding the fatty acid composition into the wastewater occurs without adding a source of nitrogen, phosphorous or potassium into the wastewater.

21. The method of claim 19, wherein the source of molecular oxygen is selected from calcium peroxide, hydrogen peroxide, and urea hydrogen peroxide.

22. The method of claim 19, wherein the source of molecular oxygen comprises between about 1 and 20 percent by weight of the one or more fatty acids.

23. The method of claim 19, wherein the one or more fatty acids comprises one or more saturated fatty acids and one or more unsaturated fatty acids.

24. The method of claim 19, wherein the one or more fatty acids comprises a saturated fatty acid selected from stearic acid, palmitic acid, lauric acid or mixtures thereof and an unsaturated fatty acid selected from oleic acid, linoleic acid or mixtures thereof.

25. The method of claim 23, wherein the ratio of the one or more saturated fatty acids to the one or more unsaturated fatty acids is between 70:30 and 30:70 by weight.

26. The method of claim 19, wherein the one or more fatty acids consists essentially of oleic acid and stearic acid.

* * * * *